April 9, 1963  C. A. STROHMEIER  3,084,376
CASTER
Filed Sept. 16, 1960
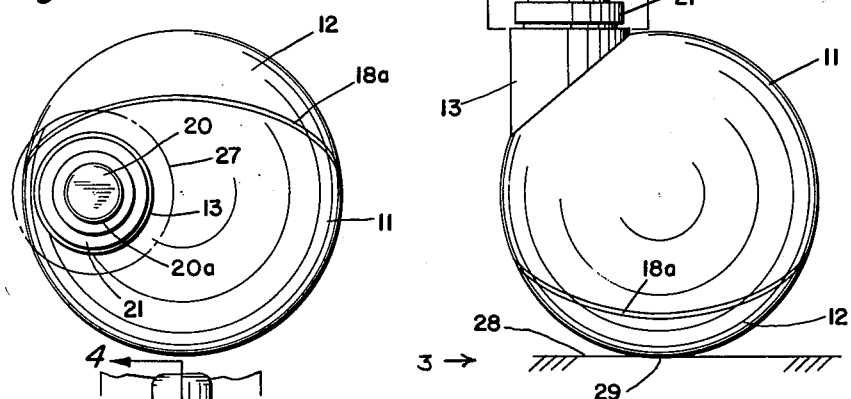
Fig. 1
Fig. 2
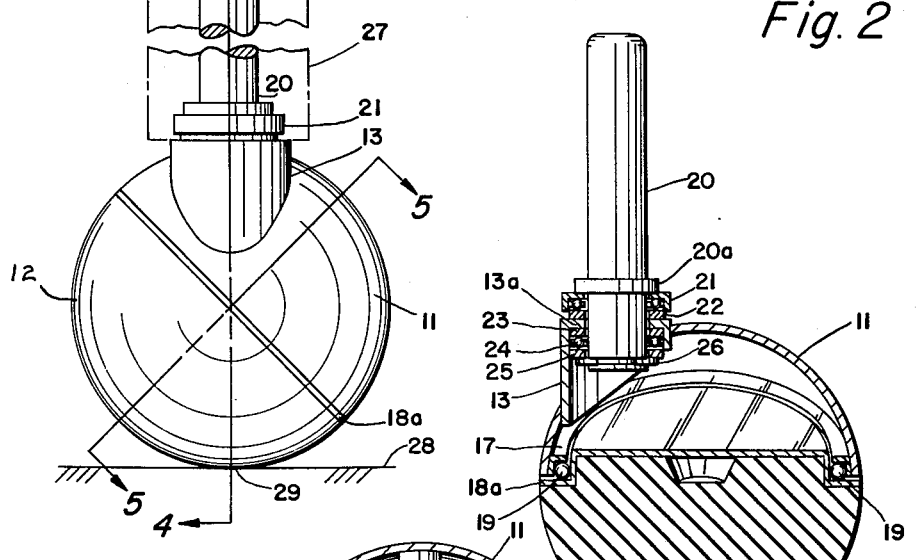
Fig. 3
Fig. 4
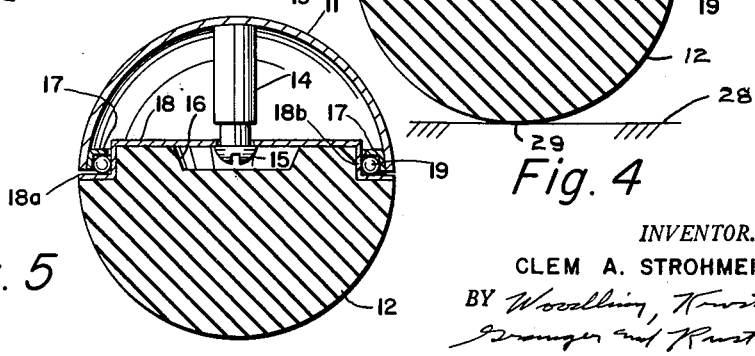
Fig. 5
INVENTOR.
CLEM A. STROHMEIER
BY
ATTORNEYS

United States Patent Office 3,084,376
Patented Apr. 9, 1963

3,084,376
CASTER
Clem A. Strohmeier, Cleveland, Ohio, assignor to Master Manufacturing Company, Inc., Cleveland, Ohio, a corporation of Ohio
Filed Sept. 16, 1960, Ser. No. 56,408
8 Claims. (Cl. 16—21)

My invention relates to casters for rollingly supporting articles such as furniture and the like.

An object of my invention is to provide an improved caster having improved operating characteristics.

Another object is to provide a caster constructed to avoid or minimize marring of a supporting surface and of other objects coming in contact with the caster.

Another object is to provide a rimless caster and thus avoid the edge of a rim tending to mar or deface objects with which the edge of the rim comes in contact.

Another object is to provide a caster having an improved ball bearing arrangement decreasing the resistance to rotation of the caster as the article supported thereby is moved along a surface.

Another object is to provide for an improved arrangement wherein ball bearings in a circular path orbit around the swivel axis of the pintle of the caster.

Another object is to provide a caster economical to manufacture and assemble and efficient in operation.

Another object is to provide a caster construction producing improved results not heretofore obtainable in a novel and useful manner.

Other objects and a fuller understanding of the invention may be had by referring to the following description and claims, taken in conjunction with the accompanying drawing, in which:

FIGURE 1 is a plan view looking down on the top of a caster embodying my invention;

FIGURE 2 is a side elevational view of the caster shown in FIGURE 1;

FIGURE 3 is a side elevational view of the caster shown in FIGURE 2 at 90° to the view of FIGURE 2 and looking in the direction of the arrows 3—3 of FIGURE 2;

FIGURE 4 is a longitudinal sectional view taken through the line 4—4 of FIGURE 3; and FIGURE 5 is a transverse sectional view taken through the line 5—5 of FIGURE 3.

My improved caster has a spherical body made up of a first hemispherical portion 11 and a second hemispherical portion 12, which together in assembled arrangement constitute substantially a sphere. Preferably the first hemispherical body portion 11 is made of metal and may be a die casting. The second hemispherical body portion 12 is preferably made of a rubber-like composition, such as rubber, artificial rubber, or one of the plastics such as nylon, producing a partially yieldable characteristic. When it is intended that the caster be used on a carpet or somewhat soft supporting surface, then it is preferable that the second hemispherical body portion 12 be made of hard rubber or of relatively hard plastic material. When it is intended that the caster be used to support articles on a relatively hard and unyielding supporting surface, then it is preferable that the second hemispherical body portion 12 be made of a somewhat yieldable material, such as semi-hardened rubber or other partially yieldable material.

Secured to and extending from the first hemispherical body portion 11 is a neck or extension 13 which has a flange portion 13a extending around its upper or free end. A pintle or swivel axle 20 is mounted in and extends from the neck or extension 13, as seen in the drawing. To provide that the pintle 20 may freely rotate on its own axis and thus swivel relative to the spherical body, bearing assemblies are utilized to provide bearing engagement between the pintle 20 and the neck or extension 13. The pintle 20 has an annular shoulder 20a and under the shoulder 20a there is positioned concentric with the pintle 20 a first bearing assembly 21 made up of a plurality of balls in a raceway. Positioned below the bearing assembly 21 and concentric with the pintle 20 is a washer 22 next adjacent the flange 13a. Below the flange 13a, there is another washer 23 and below the washer 23 there is a second bearing assembly 24 similar to the bearing assembly 21. Below the bearing assembly 24 there is a washer 25. A snap-ring 26 resiliently engages in an annular groove at the bottom end of the pintle 20 just below the washer 25.

To assemble the pintle 20 in position, the pintle 20 with the bearing assembly 21 and washer 22 mounted thereon in the relative position shown is moved so as to move the lower end of the pintle 20 down within the extension 13. Then from within the hemispherical body portion 11 the bearing assembly 24 is mounted on the pintle 20 and the washer 25 is positioned adjacent the bearing assembly 24. The snap-ring 26 is then forcibly pressed into place to engage in the annular groove and this holds the several parts together in the positions shown in FIGURE 4.

The upper end of the pintle 20 is adapted to engage an article of furniture. The reference character 27 indicates a leg of a piece of furniture shown in broken lines. The pintle 20 snugly engages, and is frictionally held in, the leg 27.

Integral with and extending radially inward from the first hemispherical body portion 11 is a post or boss 14. This post 14 extends along an axis about which the peripheral edge of the hemispherical body portion 11 is concentric. A metal disk 18 is rotatably secured to the post 14 by a threaded bolt 15 in such manner that the disk 18 may freely rotate on the axis of the post 14. There is a central recess 16 formed in the second hemispherical body 12 adjacent the disk 18 so as to accommodate the head of the bolt 15.

The disk 18 has an outer edge portion 18a offset from the main portion of the disk 18 by a circular flange portion 18b. The outer edge portion 18a and flange portion 18b are annular in shape and extend around the periphery of the disk 18. By reason of the disposition of the main portion of the disk 18 and the portions 18a and 18b, there is a recess in the disk 18 intermediate of the flange portion 18b. This recess accommodates the adjacent portion of the second hemispherical body portion 12, which is in a press fit with the disk 18. While the press fit tends to firmly retain the body portion 12 in the recess of the disk 18, I prefer to further assure the connection of the body portion 12 with the disk 18 by cementing with a suitable adhesive or cementitious material the surface of the body portion 12 with the disk 18 and its portions 18a and 18b.

There is provided within the body portion 11 inwardly from the circular edge thereof an annular shoulder spaced from the outer edge portion 18a of the disk 18. This shoulder may be integral with the body portion 11 or, as shown in the drawing, it may be provided by press fitting within the body portion 11 an annular member 17 which has a portion tightly pressed against the inner wall of the body portion 11 and a flange which extends radially inward substantially parallel to the outer edge portion 18a of the disk 18. As seen in FIGURES 4 and 5, there is provided between the annular member 17 and the portions 18a and 18b of the disk 18, an annular raceway extending around the spherical body at the juncture between the body portions 11 and 12. This annular raceway is filled with a plurality of ball bearings 19 arranged in a circular path and free to rotate within the raceway and to take both axial and radial thrust upon rotation of the body portion 12 relative to the body portion 11. The balls 19 orbit around the common axis of the body portions 11 and 12 which coincides with the axis of the post 14.

In the usual use of the caster, the pintle 20 is so carried as to be vertically disposed as the caster is supported upon and is movable along a supporting surface denoted by the reference character 28 in the drawings. The point of tangency or location of support of the spherical body on the supporting surface 28 is denoted by the reference character 29. This point of tangency 29 is located on the surface of the body portion 12. Thus as the article supported by the caster is moved along, the body portion 12 tends to rotate on the common axis coinciding with the post 14 and concentric with the raceway occupied by the balls 19.

The axis of the pintle 20 is disposed at an acute angle to a plane normal to the common axis of the body portions 11 and 12, and about which the portion 12 rotates relative to the portion 11. This axis of the pintle extends through to intercept the circular plane defined by the raceway occupied by the balls 19. The axis of the pintle 20 is offset from the axis about which the body portion 12 rotates relative to the body portion 11 and does not cross or intercept that axis. The following or caster action of the device is obtained by the offset arrangement of the axis of the pintle 20 relative to the axis about which the body portion 12 rotates relative to the body portion 11.

It is to be seen that this caster does not have a rim which may scuff or mar a floor surface nor scuff or mar objects which come into contact with the spherical surface of the caster. The inclination of the common axis of the portions 11 and 12 and about which the portion 12 rotates relative to the portion 11 assures a good rolling action by the interengagement at the point 29 of the portion 12.

A maximum circumference of the raceway occupied by the balls 19 is assured by having the raceway next adjacent the outer surface of the spherical body at the juncture of the body portions 11 and 12. A maximum number of balls, assuming the same size of balls, relative to the size of the spherical body, may be utilized by having the maximum size raceway through the arrangement shown and described. Excellent ball bearing casters are obtained so that a maximum of weight may be carried while a minimum of resistance to rotation is obtained. A maximum diameter of the orbital path of the balls is assured by the structure and arrangement herein shown and described.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A caster comprising a first hemispherical member, a second hemispherical member of substantially the same radius and juxtaposed to said first hemispherical member to form with the first hemispherical member a spherical shell with the circular edges of the members facing each other, a pintle member swivelably carried by and extending outwardly from said first hemispherical member to provide a swivel connection between said first hemispherical member and a body to be supported by the caster, said first hemispherical member having a first annular raceway portion disposed inwardly thereof adjacent the said circular edge of the first hemispherical member, said first hemispherical member having a post portion disposed intermediate of its said circular edge, a race member rotatably mounted to said post portion and extending across said first hemispherical member, said race member having a second annular raceway portion extending therearound and spaced from said first annular raceway portion to define therebetween an annular raceway concentric with the circular edges of said first and second hemispherical members, said annular raceway being disposed in a plane adjacent said circular edges, a plurality of ball bearings positioned in said annular raceway and providing a bearing engagement between said first hemispherical member substantially at the location of said circular edges and said race member, said race member and said second hemispherical member having complementary interfitting portions interengaging said race member and said second hemispherical member whereby said second hemispherical member may rotate with said race member relative to said first hemispherical member, the axis of said annular raceway being disposed at an acute angle to a plane coinciding with the axis of said pintle member and intersecting said plane at a lateral distance from said axis of the said pintle member.

2. A caster comprised of a pair of mating hemispherical members having opposed circular edge portions disposed in juxtaposition to form a spherical body, an annular raceway concentric with the common axis through said hemispherical members and disposed adjacent the opposed circular edge portions of the juxtapositioned hemispherical members, a plurality of ball bearings in said annular raceway to provide a bearing engagement between said hemispherical members, said raceway having opposed first and second annular portions rotatable relative to each other and containing said ball bearings therebetween, first means securing the first of said raceway portions to a first of said hemispherical members to permit rotative motion therebetween, second means securing the first of said raceway portions to the other of said hemispherical members, third means securing the second of said raceway portions to said first of said hemispherical members, a pintle member swivelably mounted to the first of said hemispherical members and extending along a swivel axis intersecting at an acute angle a plane normal to said common axis of the hemispherical members at a distance from said common axis.

3. A caster comprising a spherical member having a first portion rotatable about a first axis relative to a second portion, said portions having a circular juncture, an annular raceway concentric with said axis at the circular juncture of said portions, a plurality of ball bearings positioned in said raceway to provide bearing engagement between said portions, said raceway and ball bearings being disposed proximate to the outer circumference of said portions at said circular juncture to obtain a substantially maximum circular path for said ball bearings within the confines of said spherical member, said circular path being next adjacent said circular juncture in a plane bisecting said first axis through the center of the spherical member, a pintle member adapted to be mounted to an article to be supported by the caster and swivelably mounted to said second portion of the special member and extending therefrom along a second axis, said second axis being disposed to intersect at an acute angle a plane normal to the first axis and at a lateral distance from said first axis, the disposition of said axes being such that said first portion engages a supporting surface normal to the second axis at a point of tangency spaced from said first axis and from said circular juncture.

4. A caster comprising a first hemispherical member, a second hemispherical member, said hemispherical members having opposed circular portions forming a circular juncture therebetween at the common circumference of said hemispherical members and together forming a sphere, said second hemispherical member being rotatable relative to the first hemispherical member on a first axis concentric with said circular juncture, said circular juncture being disposed substantially in a plane bisecting said axis through the center of said sphere, an annular raceway substantially in said plane and next adjacent said circular juncture and concentric with said first axis, a plurality of ball bearings in said raceway to provide bearing engagement between said members upon rotation of the second hemispherical member on said first axis, said second hemispherical member having a spherical substantially smooth rimless outer surface portion of rubber-like material adapted to engage a supporting surface at the point of tangency between said sphere and said supporting surface, a pintle member swivelably connected to the said first hemispherical member and extending therefrom along a second axis, said second axis being disposed at an acute angle to a plane passing through said circular juncture and normal to the said first axis, said second axis intersecting said plane at a distance from said first axis.

5. A caster comprising a sphere having a first hemispherical portion and a second hemispherical portion rotatable relative to the first hemispherical portion about a common axis, said second portion being of rubber-like material adapted to provide marless engagement with a supporting plane and providing a substantially spherical contour at the location of said supporting plane, a plurality of ball bearings arranged in a circular path concentric with said common axis and arranged to provide bearing interengagement of said portions upon rotation of the second portion on said common axis relative to the first portion, said circular path being in a plane substantially bisecting said common axis through the center of said sphere, said circular path being generated about said common axis in said plane on a radius approaching the radius of said sphere to provide a said circular path which is slightly smaller than the circumference of said sphere, a swivel axle extending from said first portion and swivelable on the axis of said swivel axle, said swivel axis extending through the plane defined by said circular path of said ball bearings and intersecting said plane at an acute angle, said swivel axis being offset from the center of said sphere.

6. In a caster construction, the combination of a spherical body, said spherical body being transversely separated into two substantially equal portions through a plane normal to, and substantially bisecting, a first axis extending through the center of the spherical body, means connecting said portions to permit a first portion to rotate on said first axis relative to said second portion while maintaining said portions together in a spherical shape, an annular raceway within said spherical body concentric with said first axis arranged adjacent the outer peripheral surface of said spherical body at the juncture between said portions in said plane, a plurality of ball bearings arranged in a circular path in said raceway and providing bearing interengagement between said portions, and a swivel member extending along a second axis from said second portion and swivelably connected thereto, said swivel member being adapted to be engaged by an article supported by said caster, the said second axis extending intermediate the boundary of said annular raceway and intersecting said plane at an acute angle thereto at a radial distance from said first axis in said plane.

7. In a caster having a first portion and a second portion assembled together and having a substantially spherical outer surface, means rotatively connecting said portions to permit rotation of one portion relative to the other portion about an axis, said portions being substantially equal in size and meeting at a circular juncture disposed in a plane normal to and bisecting said axis through the center of the assembled first and second portions, bearing means for providing bearing interengagement of said portions, said bearing means comprising an annular raceway having a first annular portion carried by said first portion adjacent the outer surface thereof at the juncture of said portions, said annular raceway having a second annular portion carried by said second portion adjacent the outer surface thereof at the juncture of said portions, said annular portions being spaced to accommodate ball bearings therebetween, and a plurality of ball bearings arranged in a circular path in said raceway between said spaced annular portions.

8. The improvement in a caster of a first member, a second member rotatable on a first axis relative to said first member, said first and second members facing each other in close proximity at the juncture of the outer surfaces of said members, said juncture defining a circle concentric with the said axis of rotation, the outer surfaces of said first and second members at said juncture being disposed in a common spherical contour, an annular raceway disposed at said juncture next adjacent said outer surface of said members, said annular raceway comprising an annular portion carried by the first member and an annular portion carried by the second member, said annular portions being spaced from each other to define an annular groove, a plurality of ball bearings disposed in said groove to provide bearing interengagement of said annular portions, said ball bearings being arranged to orbit about said first axis upon rotation of said second member relative to said first member, and a swivel axle extending from said first member for attachment to an article to be supported by the caster, said swivel axle being disposed on a second axis disposed to intersect at an acute angle a plane normal to the first axis at a distance from the first axis and at a location within the circle defined by said annular raceway.

References Cited in the file of this patent

UNITED STATES PATENTS 627,012    Raymond _____ June 13, 1899

FOREIGN PATENTS 559,432    Italy _____ Mar. 21, 1957